United States Patent [19]

Tamura et al.

[11] Patent Number: 5,585,152
[45] Date of Patent: Dec. 17, 1996

[54] COMPOSITION OF POLYAMIDE RESIN AND POLYURETHANE RESIN

[75] Inventors: Tsutomu Tamura; Manabu Takeuchi, both of Ohtsu, Japan

[73] Assignee: Toyo Boseki Kabushiki Kaisha, Japan

[21] Appl. No.: 354,354

[22] Filed: Dec. 12, 1994

[30] Foreign Application Priority Data

Dec. 10, 1993 [JP] Japan ................................. 5-310163
Apr. 5, 1994 [JP] Japan ................................. 6-67240

[51] Int. Cl.$^6$ ............................ C08L 75/00; C08L 77/00
[52] U.S. Cl. .......................................... 428/35.1; 525/424
[58] Field of Search ............................. 525/424; 428/35.1

[56] References Cited

U.S. PATENT DOCUMENTS

| 4,174,358 | 12/1979 | Epstein | 525/183 |
| 4,369,285 | 1/1983 | Sanderson et al. | 524/538 |
| 4,419,499 | 12/1993 | Coran et al. | 525/424 |
| 4,742,128 | 5/1988 | Frisch et al. | 525/424 |

FOREIGN PATENT DOCUMENTS

| 0023667 | 2/1981 | European Pat. Off. . |
| 2207955 | 6/1974 | France . |
| 4035140 | 5/1992 | Germany . |
| 47-034798 | 11/1972 | Japan . |
| 49-034947 | 3/1974 | Japan . |
| 50-139844 | 11/1975 | Japan . |
| 54-127499 | 10/1979 | Japan . |
| 59-121918 | 1/1984 | Japan . |
| 61-255923 | 11/1986 | Japan . |
| 2029430 | 3/1980 | United Kingdom . |

*Primary Examiner*—Ana Woodward
*Attorney, Agent, or Firm*—Fish & Neave

[57] ABSTRACT

A polyamide composition comprising a polyamide resin (A) and a thermoplastic polyurethane resin (B) is provided. In the composition, the polyamide resin (A) constitutes a continuous phase, the thermoplastic polyurethane resin (B) constitutes a dispersed phase, and the tensile modulus of the composition is 7,000 kg/cm$^2$ or less.

8 Claims, 1 Drawing Sheet

FIGURE

COMPOSITION OF POLYAMIDE RESIN AND POLYURETHANE RESIN

BACKGROUND OF THE INVENTION

1. Field of the Invention

The present invention relates to a polyamide resin composition, and an article formed from the composition including a tank, tube, and the like. More particularly, it relates to a polyamide resin composition useful for the production of articles which have a lower tensile modulus as well as excellent oil resistance (especially, anti-gasoline fume permeability), thermal resistance, hydrolysis resistance, chemical resistance, moldability (especially, mold releasing property), impact resistance, etc., and to articles which are formed from the composition, the articles including gasoline tubes, hoses, packings, cams, gears, and the like.

2. Description of the Related Art

Recently, various multi-component resin compositions having a higher degree of impact resistance have been developed as a result of advanced research of polymer blends. In general, compositions comprising a polyamide resin, and an olefin polymer or a styrene polymer which is blended therewith are known as nylons. These nylons have a higher degree of impact resistance or a lower water-absorbing property, and include, for example, compositions of nylons and polypropylenes, compositions of nylons and ABS resins, compositions of nylons and polypropylene rubbers, and the like. However, because polyamide resins have a higher tensile modulus, articles having excellent flexibility cannot be obtained from these polyamide resin compositions.

In order to reduce the tensile modulus of the polyamide resin, polyamide elastomers, polyamide urethane copolymers, and the like have been prepared by block copolymerization of a polyamide (nylon 6, nylon 12, aromatic polyamides, etc.) as a hard segment and a polytetramethylene ether glycol (PTMG), polypropylene glycol (PPG), aliphatic polyester diol or the like as a soft segment. Although these resins have a lower tensile modulus, they provide insufficient thermal resistance and oil resistance (especially, anti-gasoline fume permeability).

Also, polyamide resin compositions comprising a polyamide resin and a thermoplastic polyurethane resin, which is blended therewith to reduce its tensile modulus, are known in the art. However, in general, the thermoplastic polyurethane resin constitutes a continuous phase in the polyamide resin composition when a relatively large amount of the polyurethane resin is blended for sufficient reduction of tensile modulus, and therefore provides some disadvantages due to the thermoplastic polyurethane resin. For example, the significant reduction of oil resistance (especially, anti-gasoline fume permeability), hydrolysis resistance, moldability (especially, mold releasing property), and the like can occur.

SUMMARY OF THE INVENTION

The polyamide resin compositions of this invention comprises a polyamide resin (A) and a thermoplastic polyurethane resin (B), wherein the polyamide resin (A) constitutes a continuous phase, the thermoplastic polyurethane resin (B) constitutes a dispersed phase, and the tensile modulus of the composition is 7,000 kg/cm² or less.

The present invention also includes a polyamide resin composition which comprises a polyamide resin (A) and a thermoplastic polyurethane resin (B), wherein the polyamide resin (A) constitutes a continuous phase, the thermoplastic polyurethane resin (B) constitutes a dispersed phase, and the composition satisfies the following equation (I):

$$\log \frac{MFR(A)}{MFR(B)} > -0.081\phi_A + 3.84 \quad (I)$$

wherein the MFR (A) indicates a melt flow rate of the polyamide resin (A) at a working temperature, the MFR (B) indicates a melt flow rate of the thermoplastic polyurethane resin (B) at the working temperature, and $\phi_A$ indicates the percent by weight of the polyamide resin (A) based on the total weight of the polyamide resin (A) and the thermoplastic polyurethane resin (B).

In a preferred embodiment, the content of the polyamide resin (A) is 60 to 20% by weight and the content of the thermoplastic polyurethane resin (B) is 40 to 80% by weight based on the total weight of the polyamide resin (A) and the thermoplastic polyurethane (B).

In a preferred embodiment, the melting point of the polyamide resin (A) is 210° C. or less.

This invention also includes an article which is formed from the above-mentioned polyamide resin composition.

In a preferred embodiment, the article is a tube.

Thus, the invention described herein makes possible the advantage of (1) providing a polyamide resin composition for obtaining articles having a higher degree of impact resistance, a lower tensile modulus as well as excellent oil resistance (especially, anti-gasoline fume permeability), thermal resistance, hydrolysis resistance, chemical resistance, moldability (especially, mold releasing property), impact resistance, etc.; and (2) providing articles which are formed from the above-described polyamide resin composition.

These and other advantages of the present invention will become apparent to those skilled in the art upon reading and understanding the following detailed description with reference to the accompanying figure.

DESCRIPTION OF THE PREFERRED EMBODIMENTS

Figure 1:
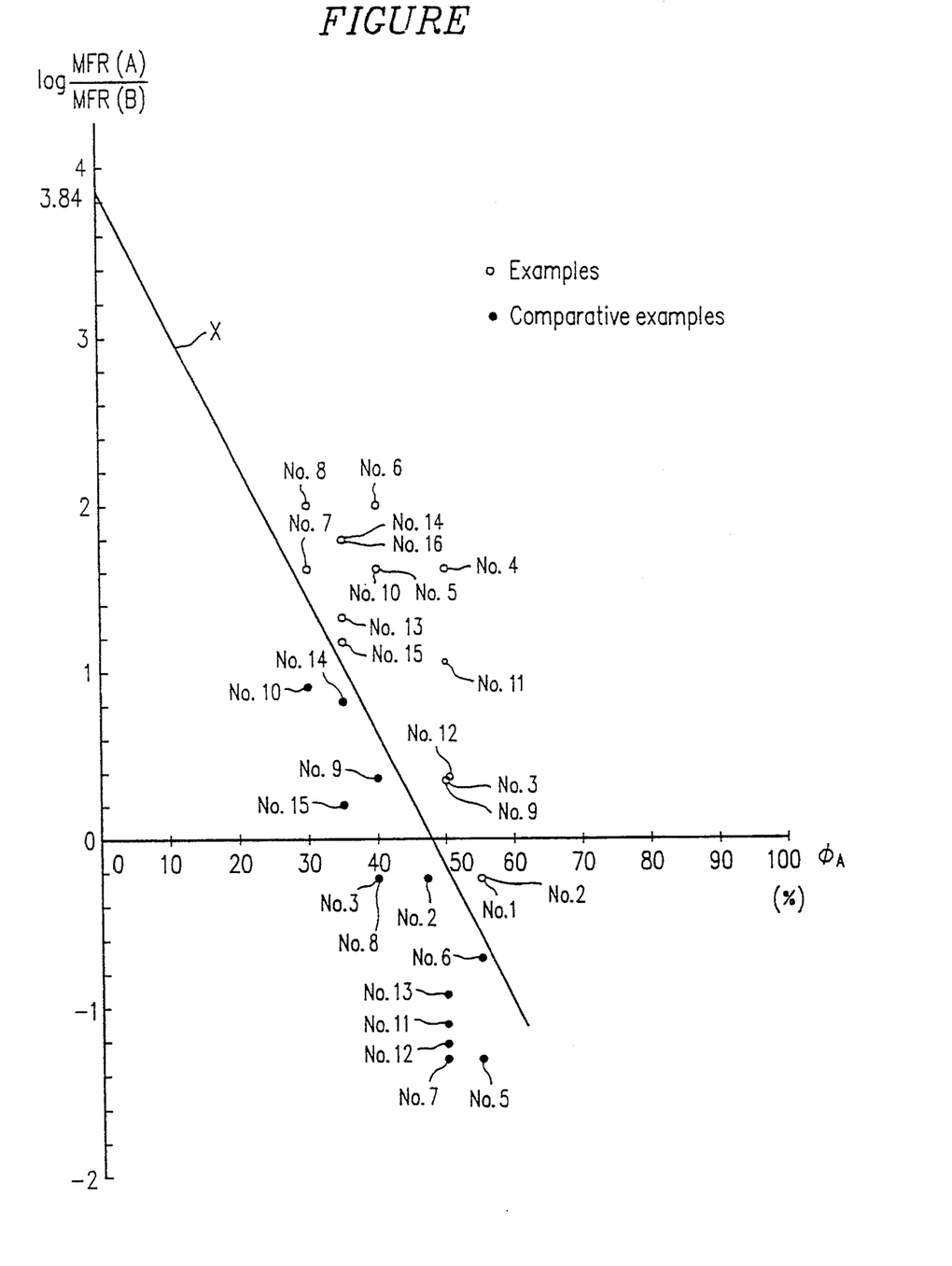
Figure shows the relationship between the $\phi_A$ value and the log (MFR(A)/MFR(B)) value of the compositions obtained in the present Examples 1–20 and Comparative Examples 1–15.

The polyamide resins (A) that can be used in the present invention include semi-crystalline and non-crystalline resins, and those resins generally called nylon resins. Polyamide resin (A) is generally prepared by reacting equimolar amounts of a saturated dicarboxylic acid having 4–12 carbon atoms with a diamine having 4–14 carbon atoms. An excess amount of the diamine may be used to provide a larger excess of the amino groups than the carboxyl groups in the polyamide terminals, and also an excess amount of the dicarboxylic acid may be used to provide a larger excess of the carboxyl groups than the amino groups in the polyamide terminals. The polyamide resins include polyhexamethylene adipamide (6,6 nylon), polymetaxylene adipamide (MXD-6 nylon), polyhexamethylene azelamide (6,9 nylon), and polyhexamethylene dodecanoamide (6,12 nylon); and polyamides prepared by the ring opening reaction of lactams, for example, polycaprolactam (6 nylon), polylaurolactam (12 nylon), poly-11-aminoundecanoic acid (11 nylon), bis(p- aminocyclohexyl) methanedodecanoamide, and the like. The polyamide resin may be used alone or blends of two or more of such resins may be used in the present invention. Copolymers containing two or more of the above-mentioned dicarboxylic acid and/or diamine can also be used.

It is preferred that the melting point of polyamide resin (A) be 210° C. or less. The polyamide resin composition of this invention is a polymer alloy in which the polyamide resin constitutes a continuous phase and the thermoplastic polyurethane resin constitutes a dispersed phase. The polymer alloys in which the polyurethane resin constitutes a continuous phase provide insufficient anti-gasoline fume permeability, thermal resistance, and the like. In the case where the polymer alloys having such a phase system where the polyamide resin constitutes a continuous phase, it is generally required that the melt viscosity of the polyamide resin be lower than the melt viscosity of the polyurethane resin. The melt viscosity of the polyurethane resin is prone to be varied by its temperature, compared to the polyamide resin. More specifically, when the melting temperature of the polyurethane resin exceeds 210° C., the viscosity of the polyurethane resin is extremely reduced and the polyurethane resin is rapidly dispersed upon heating to a temperature above its melting point. Since the viscosity of the polyamide resin is not so rapidly varied, the polyurethane resin has a relatively lower viscosity, and forms a continuous phase. Therefore, it is presently preferred that the working temperature of the polyamide resin composition be 210° C. or less, and that the melting point of polyamide resin (A) used in this invention be 210° C. or less. The polyamide resins include polyamide resin copolymers comprising 6 nylon and/or 6,6 nylon, for example, copolymers of 6 nylon and 6,6 nylon, copolymers of 6 nylon and 12 nylon, copolymers of 6,6 nylon and 12 nylon, copolymers of 6 nylon and MXD-6 nylon, copolymers of 6,6 nylon and MXD-6 nylon, and the like.

The thermoplastic polyurethane resin (B) that can be used in this invention is a polymer having a polyurethane bond which is prepared by the addition polymerization reaction of a diisocyanate and a polyol. That is, thermoplastic polyurethane resin (B) is a block copolymer prepared from a diisocyanate and a polyol as major starting materials, and further a chain extending agent. For example, thermoplastic polyurethane resin (B) has a soft segment made from a polyol having an average molecular weight of 300 to 6,000, and a hard segment made from a chain extending agent and a diisocyanate having 4 to 21 carbon atoms. Various desirable characteristics can be obtained by selecting various types of diisocyanate, polyol and chain extending agent, and combinations thereof. The thermoplastic polyurethane resin (B) can be classified into a polyester polyurethane resin, a polyether polyurethane resin and a polycarbonate polyurethane resin, depending upon the types of polyol contained as the soft segment. Polyester polyurethane resin and polycarbonate polyurethane resin are presently preferred in this invention.

A polyester polyol can be used as the polyol constituting the polyester polyurethane resin. The acid components of the polyester polyol include aliphatic saturated dicarboxylic acids having 4 to 21 carbon atoms such as glutaric acid, adipic acid, pimelic acid, subelic acid, azelaic acid, sebacic acid, dodecanedioic acid, and the like; and aromatic dicarboxylic acids such as phthalic acid, isophthalic acid, terephthalic acid, and the like, with adipic acid being generally used. The diol components of the polyester polyol that can be used include aliphatic and alicyclic compounds having 2 to 21 carbon atoms, for example, ethylene glycol, propylene glycol, trimethylene glycol, butanediol, methylpentanediol, pentanediol, hexanediol, heptanediol, octanediol, nonanediol, decanediol, dodecanediol, and the like, with butanediol being generally used. The polyester polyols used as the polyol for the polyester polyol include esters of the acid components and the diol components; the polymers thereof, for example, polyethylene adipate, polybutylene adipate, polymethylpentane adipate, polynonane adipate, polynonane isophthalate; and the copolymers thereof; with polybutylene adipate being generally used. Lactones such as polycaprolactones can also be used as the polyester polyol.

The polyols of the polyether polyurethane resins that can be used include polyether polyols. The polyether polyols that can often be used include polytetramethylene ether glycols.

The polyols of the polycarbonate polyurethane resins that can be used include polycarbonate polyols. The polycarbonate polyols include polybutylene carbonate, polyhexamethylene carbonate, and the like.

The diisocyanates constituting the thermoplastic polyurethane resin (B) include aliphatic, alicyclic, and aromatic diisocyanates. Example of these diisocyanates include 2,4-tolylene diisocyanate, 2,6-tolylene diisocyanate, 4,4'-diphenylmethane diisocyanate, 4,4'-dicyclohexylmethane diisocyanate, dianisidine isocyanate, hexamethylene diisocyanate, 3,3'-ditolylene-4,4'-diisocyanate, p-xylylene diisocyanate, 1,3-cyclohexanedimethyl isocyanate, m-xylylene diisocyanate, 1,5-naphthalene diisocyanate, transvinylene diisocyanate, methyl 2,6-diisocyanatohexanoate, diphenylether-4,4'-diisocyanate and isophorone diisocyanate. The above-mentioned diisocyanate compound can be used alone or in combination.

The chain extending agents include aliphatic and alicyclic diols having 2 to 21 carbon atoms, with butanediol being generally used.

The polyurethane resin (B) that can be used in this invention is normally obtained by the addition polymerization of a polyol and a diisocyanate in the presence of a chain extending agent.

Although the hardness (Shore A) of the thermoplastic polyurethane resin (B) is normally about 60 to 100, a lower hardness is generally preferred in order to reduce the tensile modulus of the resulting article obtained from the composition of this invention. It is presently preferred to use a thermoplastic polyurethane resin (B) having a hardness (Shore A) of 90 or less. A thermoplastic polyurethane resin having a higher melt viscosity, i.e., a lower melt flow rate, is better. This is because when thermoplastic polyurethane resin (B) is blended with polyamide resin (A) to prepare a polymer alloy comprising the polyamide resin as a continuous phase and the thermoplastic polyurethane resin as a dispersed phase, it is advantageous that the melt viscosity of the thermoplastic polyurethane resin be higher than the melt viscosity of the polyamide resin. Methods for increasing the melt viscosity of the thermoplastic polyurethane resin include those comprising increasing its molecular weight, or partially crosslinking the resin.

The first polyamide resin composition of this invention contains polyamide resin (A) and thermoplastic polyurethane resin (B), wherein polyamide resin (A) constitutes a continuous phase, and thermoplastic polyurethane resin (B) constitutes a dispersed phase, and the tensile modulus of the composition is 7,000 kg/cm$^2$ or less, as described above.

In the first polyamide resin composition of this invention, the content of polyamide resin (A) is preferably in the range of 60 to 20% by weight, and more preferably in the range of 50 to 30% by weight based on the total weight of polyamide resin (A) and thermoplastic polyurethane resin (B). Also, the content of thermoplastic polyurethane resin (B) is preferably in the range of 40 to 80% by weight, and more preferably in the range of 50 to 70% by weight based on the total weight of polyamide resin (A) and thermoplastic polyurethane resin (B). Moreover, as the content of thermoplastic polyurethane resin (B) is increased, it is preferred that the ratio of the melt viscosities of both (i.e., the melt flow rate of polyamide resin (A)/the melt flow rate of thermoplastic polyurethane resin (B)) be set higher, especially 0.5 or more, preferably 0.5 to 100. The preferred ratio can vary depending upon the types of resins selected, the molding temperatures, and the like. Thus, by adjusting the weight ratio of polyamide resin (A) to thermoplastic polyurethane resin (B), the melt flow rates of these, etc., polyamide resin (A) constitutes a continuous phase, thermoplastic polyurethane resin (B) constitutes a dispersed phase, and the tensile modulus of the first polyamide resin composition of this invention becomes 7,000 kg/cm$^2$ or less. Such a polyamide resin composition can provide soft articles having excellent oil resistance (especially, gasoline resistance), and a mold releasing property.

The second polyamide resin composition of this invention contains polyamide resin (A) and thermoplastic polyurethane resin (B), wherein polyamide resin (A) constitutes a continuous phase, and thermoplastic polyurethane resin (B) constitutes a dispersed phase, as described above, and also where the following equation (I) is satisfied. The following equation (I) is obtained as a result of the inventors' research which is illustrated in the examples described below:

$$\log \frac{MFR(A)}{MFR(B)} > -0.081\phi_A + 3.84 \qquad (I)$$

wherein MFR (A) indicates a melt flow rate of polyamide resin (A) at the working temperature, MFR (B) indicates a melt flow rate of thermoplastic polyurethane resin (B) at the working temperature, and $\phi_A$ indicates a percent by weight of the polyamide resin (A) based on the total weight of the polyamide resin (A) and thermoplastic polyurethane resin (B).

The melt flow rate is measured according to JIS K 7210 under the following conditions.

Load: 2160 g

Measurement temperature: it is measured at the working temperature of the resin composition. The working temperature refers to a temperature higher than the melting point of polyamide resin (A) by 10° to 15° C., usually about 10° C., and is preferably 210° C. or less. In the case where the working temperature exceeds 210° C., because the viscosity of thermoplastic polyurethane resin (B) is reduced as described above, a continuous phase of the polyamide resin cannot be formed.

So long as the MFR values of the components (A) and (B) are adjusted to satisfy the above equation (I) in the second polyamide resin composition of this invention, polyamide resin (A) always constitutes a continuous phase and thermoplastic polyurethane resin (B) always constitutes a dispersed phase, even if the weight ratio of the component (B) is increased in the composition. Moreover, in the second polyamide resin composition of this invention, the content of polyamide resin (A) is also preferably in the range of 60 to 20% by weight, and more preferably in the range of 50 to 30% by weight based on the total weight of polyamide resin (A) and thermoplastic polyurethane resin (B). Also, the content of thermoplastic polyurethane resin (B) is preferably in the range of 40 to 80% by weight, and more preferably in the range of 50 to 70% by weight based on the total weight of polyamide resin (A) and thermoplastic polyurethane resin (B). Thus, by adjusting the weight ratio of polyamide resin (A) to thermoplastic polyurethane resin (B), the melt flow rates of these, etc., polyamide resin (A) constitutes a continuous phase, and thermoplastic polyurethane resin (B) constitutes a dispersed phase. The polyamide resin composition of this invention having such a phase system can provide soft articles having lower tensile modulus as well as excellent impact resistance, oil resistance (especially, anti-gasoline fume permeability), thermal resistance, hydrolysis resistance, chemical resistance, moldability (especially, mold releasing property), etc.

Since the thermoplastic polyurethane resin is compatible with the polyamide resin, it is normally not necessary to use a compatibility agent, nor modify the thermoplastic polyurethane resin. Where there is a need for further improving the compatibility of the thermoplastic polyurethane resin, it may be modified by a known method, for example, acid modification with an unsaturated carboxylic acid or the anhydride thereof such as maleic anhydride.

In the polyamide resin composition of this invention, thermoplastic resins other than polyamide resin (A) and thermoplastic polyurethane resin (B), reinforcing materials, crystalline nucleus agents, mold releasing agents, flame retarders, light or heat stabilizers, plasticizers, anti-static agents, coloring agents, and the like can be contained, depending upon various uses, objectives, etc.

The other thermoplastic resins can be contained in the polyamide resin composition in an amount so that the resins do not substantially change the phase structure of polyamide resin (A) and thermoplastic polyurethane resin (B). The other thermoplastic resins include polyolefines, poly(phenylene oxide), poly(phenylene sulfide), polystyrene, polycarbonates, polyesters, polyimides, polystyrene-butadiene copolymer, polyester elastomers, poly(phenyleneether), polyacrylonitrile, butadiene rubbers, and the like. Maleic acid modified resins such as maleic acid modified styrene-ethylene-butadiene copolymer, maleic acid modified ethylene-α-olefin copolymer, and maleic acid modified polyester elastomers are preferred.

Reinforcing materials which can be used in the polyamide resin composition include fibrous reinforcing materials, filler reinforcing materials, and the like. The fibrous reinforcing materials include, but are not limited to, carbon fiber, glass fiber, and the like. The filler reinforcing materials include, but are not limited to, talc, mica, wollastonite, calcium carbonate, various whiskers, silica, kaoline, montmorillonite, clay, and the like. The amount of the reinforcing materials is preferably up to about 50 parts by weight for every 100 parts of total weight of polyamide resin (A) and thermoplastic polyurethane resin (B).

The crystalline nucleus agents include, but are not limited to, talc, clay, calcium carbide, sodium phenyl phosphinate, alumina, finely ground polytetrafluoro-ethylene, and the like. The amount of the crystalline nucleus agent is preferably up to about 3 parts by weight for every 100 parts of total weight of the polyamide resin (A) and thermoplastic polyurethane resin (B).

The mold releasing agents include, but are not limited to, metal salts of stearic acid, metal salts of montan wax, stearyl alcohol, silicone oil, and the like. The amount of the mold releasing agent is preferably up to about 2 parts by weight for every 100 parts of total weight of polyamide resin (A) and thermoplastic polyurethane resin (B).

The flame retarders include, but are not limited to, halogen type flame retarders, non-halogen type flame retarders, and the like. The halogen type flame retarders include brominated polystyrenes, polybromo diphenylether, high molecular weight brominated epoxy resins, and the like. The non-halogen type flame retarders include antimony trioxide, melamine cyanurate, red phosphorus, and the like. Especially preferred are mixtures of the halogen type flame retarders and antimony trioxide. The amount of the flame retarder agent is preferably up to about 35 parts by weight for every 100 parts of total weight of polyamide resin (A) and thermoplastic polyurethane resin (B).

The light and heat stabilizers include, but are not limited to, carbon black, mixtures of copper halides and potassium halides, hindered phenol type stabilizers, phosphorus type stabilizers, benzotriazol type stabilizers, benzophenone type stabilizers, and mixtures of these. The amount of the light and heat stabilizers flame is preferably up to about 4 parts by weight for every 100 parts of total weight of polyamide resin (A) and thermoplastic polyurethane resin (B).

The plasticizers include, but are not limited to, dioctyl phthalate, dibutylbenzyl phthalate, butylbenzyl phthalate, hydrocarbon oils, N-n-butylbenzene sulfonamide, o-toluene ethylsulfonamide, p-toluene ethylsulfonamide, and the like. The amount of the plasticizer is preferably up to about 40 parts by weight for every 100 parts of total weight of polyamide resin (A) and thermoplastic polyurethane resin (B).

Each component of the polyamide resin composition of this invention is kneaded at a temperature higher than the melting point of polyamide resin (A) by about 5° C. or more, preferably 5° to 15° C. by using a commonly used mixer such as a roller kneader, Banbury mixer, single and multi-screw extruders, and the like, and molded to form various articles. The methods for molding the composition are not specifically limited to, but include ordinary methods such as injection molding, rotational molding, extrusion, pultrusion, and the like. A tube can be effectively produced by extrusion.

The polyamide compositions of this invention are suitably utilized for the production of tanks such as gasoline tanks, oil tanks; tubes such as gasoline tubes, and the like, which especially require oil resistance (especially, gasoline resistance). Moreover, they are suitably utilized for those which cause some problems when their dimensions are varied due to the absorption of water, among parts used for household electric appliances, miscellaneous goods, automobiles, and the like. Moreover, they are suitably utilized for ski boots, wheel caps, bumpers, emblems, and the like.

EXAMPLES

The following examples specifically illustrate the present invention, but are not intended to limit the present invention.

Various physical characteristics and test results described in the examples are measured as follows.

(1) Melt Flow Rate

The melt flow rate is measured according to JIS K 7210 (measurement condition: load 2160 g).

(2) Hardness (Shore A)

The hardness (shore A) is measured according to ASTM D-2240.

(3) Tensile Modulus

The tensile modulus is measured according to ASTM D-638.

(4) Judgment of the Continuous Phase, Grain Size of the Domain Forming the Dispersed Phase The continuous phase is judged by molding a tensile dumbbell of JIS 3 type using a pellet which is obtained in the following example or comparative example and observing the sectional view of the dumbbell in the direction of resin flow using a transmission electron microscope (X 10,000) by the $RuO_4$. PTA dying an ultra-thin slice method.

(5) Anti-gasoline Fume Permeability (A) Method for Preparing a Test Piece (a thin film)

A Shinto SF type compression molding machine (manufactured by Shinto Metal Industries, Ltd.) is set to a temperature 15° C. higher than the melting point of the polyamide resin in the composition obtained in the following examples and comparative examples. The pellet obtained in the example or comparative example is charged into a mold of 0.2 mm thickness, and sandwiched by Teflon sheets which are sandwiched by iron plates. This is charged into the above-described press without applying any pressure, held in one minute, and gradually pressurized as releasing the air to a level of 100 $kg/cm^2$. After holding the pressured condition for approximately 10 seconds, the pressure is released to obtain a thin film (i.e., a test piece) of 0.2 mm thickness.

(B) Anti-gasoline Fume Permeability($g.mm/m^2.day.atm$)

A 0.04 liter brass container of cup shape having an aperture with 50 mm diameter is charged with a gasoline which has about two-third of the inner volume of the container, sealed with the test piece in the aperture, and secured by a screw. After allowing the container to stand in an oven having a controlled temperature of 40±1° C. for 4 days, a reduced weight of the gasoline is calculated from the remaining amount of gasoline, and the gasoline fume permeability of the test piece is calculated according to equation (II).

$$D = \frac{Q \times 1/s}{1/t} = \frac{Qt}{S} \qquad (II)$$

wherein D indicates the anti-gasoline fume permeability (coefficient of permeability), t indicates the film thickness (mm) of the test piece, Q indicates the reduced weight of the gasoline (g/day), and S indicates the area ($m^2$) of the test piece which is in contact with the gasoline fumes. Additionally, t is measured by using a calipers down to the second decimal point. Q is measured down to the third decimal point.

(6) Hydrolysis Resistance

Hydrolysis resistance is evaluated as follows. A dumbbell of JIS 3 type is prepared using the pellet which is obtained in the following example or comparative example. The dumbbell is immersed in a 95° C. hot water for 60 days, and vacuum dried at 80° C. for 2 days for the purpose of removing the water which is absorbed into the dumbbell. The tensile strength of the dumbbell is obtained by pulling the dumbell at a rate of 100 mm/min with increasing force, measuring the rupture strength at 23° C. in 65% RH, and calculating using the following equation:

$$\frac{\text{Tensile strength}}{(kg/cm^2)} = \frac{\text{Rupture strength}}{\text{Cross section of dumbbell}}$$

The tensile strength of the immersed dumbbell and that of the original dumbbell is compared and the holding percentage of the tensile strength is calculated. The evaluation of hydrolysis resistance is as follows:

o: holding percentage of 50% or more

X: holding percentage of less than 50%

(7) Mold Releasing Property

The mold releasing property of the article which is obtained by the use of the pellet obtained in the following example or comparative example is evaluated by using an injection molding machine according to the following conditions. The molding machine employed is a FS-75 produced by Nissei plastics Industrial Co. Ltd.; the injection time is 10 sec; the cooling time is variable; the cylinder setting temperature is a temperature 10° C. higher than the melting point of the polyamide resin; the mold temperature is room temperature; and the article shape is a plate (100 mm×100 mm×2 mm side guard).

Judgment of the mold release property is as follows:

o: Continuous molding is possible without any problem when the cooling time is set within 10 seconds.

X: Continuous molding is impossible due to deformation, mold releasing defects, etc., when the article is released from the mold with the ejector pin when the cooling time is within 10 seconds.

EXAMPLE 1

A copolymer of 6 nylon and 6,6 nylon (having a melting point of 190° C., and a melt flow rate of 65 g/10 minutes (200° C.)) as a polyamide resin (A), and a caprolactone polyester type thermoplastic polyurethane (PANDEX T-5080 manufactured by Dainippon Ink and Chemicals, Inc.) as a thermoplastic polyurethane resin (B) were blended at the weight ratio illustrated in Table 1, and kneaded at 200° C. (a temperature 10° C. higher than the melting point (190° C.) of polyamide resin (A) by using a 30 mm twin-screw extruder (manufactured by Ikegai Corporation) at a screw rotation frequency of 80 rpm.

The resulting composition was discharged from the extruder, cooled in a water bath, cut off with a cutter, vacuum dried at 80° C. for 16 hours, and molded into a pellet having a 2 mm diameter and a 2 mm length. The properties of the pellet were evaluated. Table 1 illustrates the results.

In Table 1, Ia corresponds to the left side of the equation (I), i.e., the following:

$$Ia = \log \frac{MFR(A)}{MFR(B)}$$

wherein the MFR(A) indicates a melt flow rate of polyamide resin (A) at the working temperature, and the MFR(B) indicates a melt flow rate of thermoplastic polyurethane resin (B) at the working temperature.

Ib corresponds to the right side of the equation (I), i.e., the following:

$$Ib = -0.081\,\phi_A + 3.84$$

wherein $\phi_A$ indicates the percent by weight of polyamide resin (A) for the total weight of polyamide resin (A) and thermoplastic polyurethane resin (B).

COMPARATIVE EXAMPLES 1–4

A composition was obtained by the same procedure as in Example 1 except that the ratio of polyamide resin (A) to thermoplastic polyurethane resin (B) blended was varied as illustrated in Table 1. The resulting composition was molded into a pellet, and the properties of the pellet were evaluated by the same procedure as in Example 1. Table 1 illustrates the results.

TABLE 1

|  | Example 1 | Comparative example 1 | Comparative example 2 | Comparative example 3 | Comparative example 4 |
| --- | --- | --- | --- | --- | --- |
| PA (wt %) | 55 | 100 | 45 | 40 | 0 |
| TPU (wt %) | 45 | 0 | 55 | 60 | 100 |
| MFR ratio PA/TPU | 0.6 | — | 0.6 | 0.6 | — |
| Ia | −0.22 | — | −0.22 | −0.22 | — |
| Ib | −0.62 | — | +0.20 | +0.60 | — |
| Composition |  |  |  |  |  |
| Tensile modulus (kg/cm$^2$) | 3,000 | 28,000 | 1,000 | 380 | 280 |
| Continuous phase | PA | PA | TPU | TPU | TPU |
| Anti-gasoline fume permeability (g · mm/m$^2$ · day · atm) | 6 | 0.4 | 70 | 90 | 100 |
| Mold releasing property | O | O | X | X | X |
| Hydrolysis resistance | O | O | X | X | X |

PA: Polyamide resin(A)
TPU: Thermoplastic polyurethane resin(B)

EXAMPLES 2–8

A composition was obtained by the same procedure as in Example 1 except that the each of polyamide resin (A) and thermoplastic polyurethane resin (B) illustrated in Table 2 were blended at the weight ratio illustrated in Table 2. The resulting composition was molded into a pellet, and the properties of the pellet were evaluated by the same procedure as in Example 1. Table 2 illustrates the results.

COMPARATIVE EXAMPLES 5–10

A composition was obtained by the same procedure as in Example 1 except that each of polyamide resin (A) and thermoplastic polyurethane resin (B) illustrated in Table 2 were blended at the weight ratio illustrated in Table 2. The resulting composition was molded into a pellet, and the properties of the pellet were evaluated by the same procedure as in Example 1. Table 3 illustrates the results.

The abbreviations in Tables 2 and 3 are as follows:

NY6/66 copolymer: a 6 nylon/6,6 nylon (80/20 weight ratio) copolymer

T-5080: a caprolactone polyester type polyurethane resin, PANDEX T-5080, Dainippon Ink and Chemicals Inc., a surface hardness (Shore A) of 80

E-580F: a caprolactone polyester type polyurethane resin, Miractran E580F, Nippon Miractran Co. Ltd., a surface hardness (Shore A) of 80

TABLE 2

|  | Example 2 | Example 3 | Example 4 | Example 5 | Example 6 | Example 7 | Example 8 |
|---|---|---|---|---|---|---|---|
| PA | | | | | | | |
| Polymer | NY6/66 copolymer | NY6/66 copolymer | NY6/66 copolymer | NY6/66 copolymer | NY6/66 copolymer | NY6/66 copolymer | NY6/66 copolymer |
| Amount (wt %) | 55 | 50 | 50 | 40 | 40 | 30 | 30 |
| MFR at 200° C. (g/10 min.) | 6.5 | 25 | 120 | 120 | 300 | 120 | 300 |
| TPU | | | | | | | |
| Polymer | T-5080 | T-5080 | E-580F | E-580F | E-580F | E-580F | C-580F |
| Amount (wt %) | 45 | 50 | 50 | 60 | 60 | 70 | 70 |
| MFR at 200° C. (g/10 min.) | 11 | 11 | 3.1 | 3.1 | 3.1 | 3.1 | 3.1 |
| Ia | −0.22 | 0.36 | 1.59 | 1.59 | 1.99 | 1.59 | 1.99 |
| Ib | −0.615 | −0.21 | −0.21 | 0.6 | 0.6 | 1.41 | 1.41 |
| MFR ratio (PA/TPU) | 0.6 | 2.3 | 39 | 39 | 97 | 39 | 97 |
| Composition | | | | | | | |
| Tensile modulus (kg/cm$^2$) | 3,000 | 5,000 | 6,500 | 2,800 | 2,900 | 1,700 | 1,800 |
| Continuous phase | PA | PA | PA | PA | PA | PA | PA |
| Anti-gasoline fume permeability (g · mm/m$^2$ · day · atm) | 6 | 0.5 | 0.4 | 0.4 | 0.4 | 2.6 | 1.8 |
| Mold releasing property | ◯ | ◯ | ◯ | ◯ | ◯ | ◯ | ◯ |
| Hydrolysis resistance | ◯ | ◯ | ◯ | ◯ | ◯ | ◯ | ◯ |

PA: Polyamide resin(A)
TPU: Thermoplastic polyurethane resin(B)

TABLE 3

|  | Comparative example 5 | Comparative example 6 | Comparative example 7 | Comparative example 8 | Comparative example 9 | Comparative example 10 |
|---|---|---|---|---|---|---|
| PA | | | | | | |
| Polymer | NY6/66 copolymer | NY6/66 copolymer | NY6/66 copolymer | NY6/66 copolymer | NY6/66 copolymer | NY6/66 copolymer |
| Amount (wt %) | 55 | 55 | 50 | 40 | 40 | 30 |
| MFR at 200° C. (g/10 min.) | 0.5 | 2.0 | 0.5 | 6.5 | 25 | 25 |
| TPU | | | | | | |
| Polymer | T-5080 | T-5080 | T-5080 | T-5080 | T-5080 | E-580F |
| Amount (wt %) | 45 | 45 | 50 | 60 | 60 | 70 |
| MFR at 200° C. (g/10 min.) | 11 | 11 | 11 | 11 | 11 | 3.1 |
| Ia | −1.30 | −0.70 | −1.30 | −0.22 | 0.36 | 0.90 |
| Ib | −0.615 | −0.615 | −0.21 | 0.6 | 0.6 | 1.41 |
| MFR ratio (PA/TPU) | 0.05 | 0.2 | 0.05 | 0.6 | 2.3 | 8 |
| Composition | | | | | | |
| Tensile modulus (kg/cm$^2$) | 500 | 1,100 | 430 | 380 | 1,200 | 900 |
| Continuous phase | TPU | TPU | TPU | TPU | TPU | TPU |
| Anti-gasoline fume permeability (g · mm/m$^2$ · day · atm) | 80 | 70 | 80 | 90 | 80 | 80 |
| Mold releasing property | X | X | X | X | X | X |
| Hydrolysis resistance | X | X | X | X | X | X |

PA: Polyamide resin(A)
TPU: Thermoplastic polyurethane resin(B)

EXAMPLES 9-12

Polyamide resin (A) and thermoplastic polyurethane resin (B) illustrated in Table 4 were blended at the weight ratio illustrated in Table 4, and kneaded at the temperature illustrated in Table 4 by using a 30 mm twin-screw extruder (manufactured by Ikegai Corporation). The rotation frequency of the screw was 80 rpm. The resulting composition was molded into a pellet, and the properties of the pellet were evaluated by the same procedure as in Example 1. Table 4 illustrate the results.

COMPARATIVE EXAMPLES 11-13

Polyamide resin (A) and thermoplastic polyurethane resin (B) illustrated in Table 4 were blended at the weight ratio illustrated in Table 4, and kneaded at the temperature illustrated in Table 4 by using a 30 mm twin-screw extruder (manufactured by Ikegai Corporation) at a screw rotation frequency of 80 rpm. The resulting composition was molded into a pellet, and the properties of the pellet were evaluated by the same procedure as in Example 1. Table 4 illustrates the results.

The abbreviations in Table 4 are as follows:
NY-66: 6,6 nylon; T-662, manufactured by Toyo Boseki Inc.
MXD-6: a polymetaxylene adipamide; T-600, manufactured by Toyo Boseki Inc.
NY-6: 6-nylon; T-802, manufactured by Toyo Boseki Inc.
NY6/66 copolymer: a 6 nylon/6,6 nylon (80/20 weight ratio) copolymer
NY6/12 copolymer: a 6 nylon/12 nylon (75/25 weight ratio) copolymer
NY12: 12 nylon; L-1801, manufactured by Daicel-Hüls Ltd.
T-5080: a caprolactone polyester type polyurethane resin; PANDEX T-5080, Dainippon Ink and Chemicals Inc., a surface hardness (Shore A) of 80
E-580F: a caprolactone polyester type polyurethane resin; Miractran E580F, Nippon Miractran Co. Ltd., a surface hardness (Shore A) of 80

TABLE 4

|  | Example 9 | Example 10 | Example 11 | Example 12 | Comparative example 11 | Comparative example 12 | Comparative example 13 |
|---|---|---|---|---|---|---|---|
| PA | | | | | | | |
| Polymer | NY6/66 copolymer | NY6/66 copolymer | NY6/12 copolymer | NY-12 | NY-66 | MXD-6 | NY-6 |
| Melting Point (°C.) | 190 | 190 | 180 | 176 | 260 | 243 | 220 |
| Amount (wt %) | 50 | 40 | 50 | 50 | 50 | 50 | 50 |
| MPR at working temperature (g/10 min.) | 25 | 120 | 25 | 5.5 | 50 | 40 | 30 |
| TPU | | | | | | | |
| Polymer | T-5080 | E-580F | T-5080 | T-5080 | T-5080 | T-5080 | T-5080 |
| Amount (wt %) | 50 | 60 | 50 | 50 | 50 | 50 | 50 |
| MFR at working temperature (g/10 min.) | 11 | 3.1 | 2.3 | 2.3 | Above 600 (decomposed) | Above 600 (decomposed) | 250 |
| Working temperature (°C.) | 205 | 205 | 190 | 190 | 270 | 253 | 230 |
| MFR ratio (PA/TPU) | 2.27 | 39 | 11 | 2.4 | 0.08 or less | 0.06 or less | 0.12 |
| Ia | 0.35 | 1.59 | 1.04 | 0.38 | −1.10 | −1.22 | −0.92 |
| Ib | −0.21 | 0.6 | −0.21 | −0.21 | −0.21 | −0.21 | −0.21 |
| Composition | | | | | | | |
| Tensile modulus (kg/cm$^2$) | 5,000 | 2,800 | 5,500 | 4,000 | 480 | 420 | 520 |
| Continuous phase | PA | PA | PA | PA | TPU | TPU | TPU |
| Anti-gasoline fume permeability (g · mm/m$^2$ · day · atm) | 0.5 | 0.4 | 1.0 | 7 | 90 | 90 | 85 |

PA: Polyamide resin(A)
TPU: Thermoplastic polyurethane resin(B)

EXAMPLES 13-16

Polyamide resin (A) and thermoplastic polyurethane resin (B) illustrated in Table 5 were blended at the weight ratio illustrated in Table 5, and kneaded at the temperature illustrated in Table 5 by using a 30 mm twin-screw extruder (manufactured by Ikegai Corporation) at a screw rotation frequency of 80 rpm. The resulting composition was molded into a pellet, and the properties of the pellet were evaluated by the same procedure as in Example 1. Table 5 illustrates the results.

COMPARATIVE EXAMPLES 14-15

Polyamide resin (A) and thermoplastic polyurethane resin (B) illustrated in Table 5 were blended at the weight ratio illustrated in Table 5, and kneaded at the temperature illustrated in Table 5 by using a 30 mm twin-screw extruder (manufactured by Ikegai Corporation) at a screw rotation frequency of 80 rpm. The resulting composition was molded into a pellet, and the properties of the pellet were evaluated by the same procedure as in Example 1. Table 5 illustrates the results.

The abbreviations in Table 5 are as follows:
NY6/66 copolymer: a 6 nylon/6,6 nylon (80/20 weight ratio) copolymer
E-580F: a caprolactone polyester type polyurethane resin; Miractran E580F, Nippon Miractran Ltd., a surface hardness (Shore A) of 80
E-580F (1): E-580F to which 5% by weight of a crosslinking thickener (Crossnate EM-30, manufactured by Dainichiseika Color & Chemicals Mfg. Co. Ltd.,) is added to increase its melt viscosity (i.e., decrease its melt flow rate)

E-580F (2): E-580F to which 10% by weight of a crosslinking thickener (Crossnate EM-30, manufactured by Dainichiseika Color & Chemicals Mfg. Co. Ltd.,) is added to increase its melt viscosity E-1080A: an adipate polyester type polyurethane resin, Toyobo Urethane E1080A, Toyobo Co. Ltd., a surface hardness (shore A) of 80

E-1080A (1): E-1080A to which 5% by weight of a crosslinking thickener (Crossnate EM-30, manufactured by Dainichiseika Color & Chemicals Mfg. Co. Ltd.,) is added to increase its melt viscosity E-1080A (2): E-1080A to which 10% by weight of a crosslinking thickener (Crossnate EM-30, manufactured by Dainichiseika Color & Chemicals Mfg. Co. Ltd.,) is added to increase its melt viscosity TABLE 6-continued

| | Example 17 | Example 18 | Example 19 | Example 20 |
|---|---|---|---|---|
| Anti-gasoline fume permeability (g · mm/m² · day · atm) | 0.4 | 0.2 | 0.1 | 0.1 |
| Mold releasing property | ◯ | ◯ | ◯ | ◯ |

PA: Polyamide resin(A)
TPU: Thermoplastic polyurethane resin(B)

TABLE 5

| | Example 13 | Example 14 | Example 15 | Example 16 | Comparative example 14 | Comparative example 15 |
|---|---|---|---|---|---|---|
| PA | | | | | | |
| Polymer | NY6/66 copolymer | NY6/66 copolymer | NY6/66 copolymer | NY6/66 copolymer | NY6/66 copolymer | NYG/66 copolymer |
| Amount (wt %) | 35 | 35 | 35 | 35 | 35 | 35 |
| MFR at 200° C. (g/10 min.) | 12 | 12 | 12 | 12 | 12 | 12 |
| TPU | | | | | | |
| Polymer | E580F(1) | E580F(2) | E1080A(1) | E1080A(2) | E580F | E1080A |
| Amount (wt %) | 65 | 65 | 65 | 65 | 65 | 65 |
| MFR at 200° C. (g/10 min.) | 0.6 | 0.2 | 0.8 | 0.2 | 1.9 | 8.0 |
| MFR ratio (PA/TPU) at 200° C. | 20 | 60 | 15 | 60 | 6.3 | 1.5 |
| Ia | 1.30 | 1.78 | 1.17 | 1.78 | 0.80 | 0.18 |
| Ib | 1.01 | 1.01 | 1.01 | 1.01 | 1.01 | 1.01 |
| Composition | | | | | | |
| Tensile modulus (kg/cm²) | 2,250 | 2,300 | 2,300 | 2,450 | 1,050 | 520 |
| Continuous phase | PA | PA | PA | PA | TPU | TPU |
| Anti-gasoline fume permeability (g · mm/m² · day · atm) | 1.3 | 0.4 | 0.3 | 0.2 | 85 | 60 |

PA: Polyamide resin(A)
TPU: Thermoplastic polyurethane resin(B)

EXAMPLES 17-20

A composition was obtained by the same procedure as in Example 5 except that the surface hardness (Shore A) and the MFR ratio of polyamide resin (A) and thermoplastic polyurethane resin (B) (i.e., the MFR of polyamide resin (A)/the MFR of thermoplastic polyurethane resin (B)) in the molding stage were varied as illustrated in Table 6. The resulting composition was molded into a pellet, and the properties of the pellet were evaluated by the same procedure as in Example 5. Table 6 illustrates the results.

TABLE 6

| | Example 17 | Example 18 | Example 19 | Example 20 |
|---|---|---|---|---|
| Surface hardness of TPU | 60A | 70A | 80A | 95A |
| MFR ratio (PA/TPU) at working temperature | 39 | 39 | 39 | 39 |
| Ia | 1.59 | 1.59 | 1.59 | 1.59 |
| Ib | 0.60 | 0.60 | 0.60 | 0.60 |
| Composition | | | | |
| Tensile modulus (kg/cm²) | 1,100 | 1,800 | 2,800 | 4,000 |
| Continuous phase | PA | PA | PA | PA |

As can be seen from Tables 1–6, the compositions of the present invention in which the polyamide resin constitutes a continuous phase have excellent anti-gasoline fume permeability and mold releasing property. There are various factors such as the types of resins, the amount of each component blended, the MFR ratio, etc., to form a continuous phase of the polyamide resin. For example, when the Ia value is greater than the Ib value, the polyamide resin forms a continuous phase. It is to be understood that the surface hardness of the thermoplastic polyurethane resin may be lowered so as to reduce the tensile modulus of the composition.

EXAMPLE 21

The log (MFR(A)/MFR(B)) value of each of the compositions obtained in Examples 1–16 and Comparative Examples 2, 3 and 5–15 was plotted as a function of its $\phi_A$ value in Figure, wherein the MFR(A) indicates a melt flow rate of polyamide resin (A) at the working temperature, the MFR(B) indicates a melt flow rate of thermoplastic polyurethane resin (B) at the working temperature, and $\phi_A$ indicates the % by weight of polyamide resin (A) based on the total weight of polyamide resin (A) and thermoplastic polyurethane resin (B).

The plot of Figure leads to the relationship between the $\phi_A$ value and the log (MFR(A)/MFR(B)) value of the suitable compositions. It can be seen from Figure that suitable compositions are located in the upper side of the straight line X, i.e., the compositions satisfy the equation (I). In this case, it is to be understood that the polyamide constitutes a continuous phase in the polyamide resin composition. The polyamide resin composition provides excellent anti-gasoline fume permeability and mold releasing property.

As illustrated in the above-described examples and comparative examples, because the polyamide resin compositions of the present invention have lower tensile modulus as well as excellent anti-gasoline fume permeability, they provide a variety of benefits and are utilized for various articles. For example, in the case where the composition is used as a gasoline hose, the hose does not require a specific coupler when it is connected to a predetermined article.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polyamide composition characterized by a tensile modulus of 7,000 kg/cm² or less and comprising a polyamide resin (A) and a thermoplastic polyurethane resin (B), wherein:

(1) the polyamide resin (A) is present in 50 to 30% of the combined weight of the polyamide resin (A) and the thermoplastic polyurethane (B) and constitutes a continuous phase; and (2) the thermoplastic polyurethane resin (B) is present in 50 to 70% of the combined weight of the polyamide resin (A) and the thermoplastic polyurethane (B) and constitutes a dispersed phase.

2. The polyamide resin composition of claim 1, wherein the melting point of the polyamide resin (A) is 210° C. or less.

3. An article which is formed from the polyamide resin composition of claim 1.

4. A polyamide composition characterized by a tensile modulus of 7,000 kg/cm² or less and comprising a polyamide resin (A) and a thermoplastic polyurethane resin (B), wherein:

(1) the polyamide resin (A) is present in 50 to 30% of the combined weight of the polyamide resin (A) and the thermoplastic polyurethane (B) and constitutes a continuous phase;

(2) the thermoplastic polyurethane resin (B) is present in 50 to 70% of the combined weight of the polyamide resin (A) and the thermoplastic polyurethane (B) and constitutes a dispersed phase; and (3) the polyamide composition satisfies the following equation (I):

$$\log \frac{MFR(A)}{MFR(B)} > -0.081\phi_A + 3.84 \qquad (I)$$

wherein MFR (A) indicates a melt flow rate of the polyamide resin (A) at a working temperature, MFR (B) indicates a melt flow rate of the thermoplastic polyurethane resin (B) at the same working temperature, and $\phi_A$ indicates the percent by weight of the polyamide resin (A) based on the combined weight of polyamide resin (A) and thermoplastic polyurethane resin (B) in the composition.

5. The polyamide resin composition of claim 4, wherein the melting point of the polyamide resin (A) is 210° C. or less.

6. An article which is formed from the polyamide resin composition of claim 4.

7. The article of claim 3, wherein the article is a tube.

8. The article of claim 6, wherein the article is a tube.

* * * * *

UNITED STATES PATENT AND TRADEMARK OFFICE
CERTIFICATE OF CORRECTION

PATENT NO.  : 5,585,152
DATED       : December 17, 1996
INVENTOR(S) : Tamura et al.

It is certified that error appears in the above-indentified patent and that said Letters Patent is hereby corrected as shown below:

Table 1, columns 9-10: please delete the term "MFR ratio PA/TPU" and substitute therefor -- MFR ratio (PA/TPU) --;

Table 2, columns 11-12, in the column entitled "Example 8": please delete the term "C-580F" and substitute therefor -- E-580F --;

Table 4, columns 13-14: please delete the term "MPR at working temperature" and substitute therefor -- MFR at working temperature --;

Table 5, column 15-16: please underscore the term "TPU";

Table 5, column 15-16, in the column entitled "Example 15": please delete the term "NYG/66" and substitute therefor -- NY6/66 --;

Signed and Sealed this

Twenty-third Day of September, 1997

Attest:

BRUCE LEHMAN

*Attesting Officer*    *Commissioner of Patents and Trademarks*